United States Patent
Taylor et al.

(12)
(10) Patent No.: US 6,387,171 B1
(45) Date of Patent: May 14, 2002

(54) CONCRETE COMPOSITIONS AND METHODS FOR THE PREPARATION THEREOF

(75) Inventors: J. Steve Taylor; Harry M. Kennedy, both of Muscatine, IA (US)

(73) Assignee: Grain Processing Corporation, Muscatine, IA (US)

( * ) Notice: Subject to any disclaimer, the term of this patent is extended or adjusted under 35 U.S.C. 154(b) by 0 days.

(21) Appl. No.: 09/578,542

(22) Filed: May 25, 2000

(51) Int. Cl.[7] .................. C04B 16/08; C04B 24/10; C04B 38/00
(52) U.S. Cl. .............. 106/674; 106/730; 106/795; 106/804
(58) Field of Search ................... 106/674, 730, 106/795, 804

(56) References Cited

U.S. PATENT DOCUMENTS 4,073,658 A * 2/1978 Ohtani et al. .............. 106/92
4,088,504 A * 5/1978 Collepardi ................. 106/90
5,221,343 A * 6/1993 Grauer et al. .............. 106/729
5,595,595 A * 1/1997 Glenn ....................... 106/672
6,162,839 A * 12/2000 Klauck et al. .............. 521/83

* cited by examiner

*Primary Examiner*—Elizabeth D. Wood
(74) *Attorney, Agent, or Firm*—Leydig, Voit & Mayer LTD

(57) ABSTRACT

Disclosed is a concrete composition that comprises water, a cementitious material, and an aggregate material, the aggregate material comprising a granular starch. In accordance with preferred embodiments of the invention, the granular starch is a washed, pre-swollen starch, and is added to the composition in an amount ranging from about 1% to about 20% by weight of the cementitious material. The starch granules are swollen in the uncured composition but liberate water and shrink to their unswollen size as the concrete cures, thus providing a cured lightweight concrete. Also disclosed is a method for preparing a concrete composition. The disclosed method comprises providing starch granules, mixing the starch granules with water and a cementitious material to form an uncured concrete composition, and subsequently curing the uncured concrete composition thus formed.

9 Claims, No Drawings

CONCRETE COMPOSITIONS AND METHODS FOR THE PREPARATION THEREOF

TECHNICAL FIELD OF THE INVENTION

The present invention is directed towards concrete compositions and methods for the preparation thereof. More specifically, the invention is directed in its preferred embodiments towards "lightweight" or low-density concrete compositions that generally comprise a cementitious material and an aggregate material that is relatively less dense than aggregate materials used in conventional concretes.

BACKGROUND OF THE INVENTION

Concrete is a hardened material that is formed by blending a cementitious material, typically Portland cement, with an aggregate material and water to form an uncured concrete composition, and subsequently curing the concrete composition. Conventionally used aggregate materials include gravel, shale, stone, and like materials. Concretes that are formulated with such conventional aggregate materials have a density that typically ranges from about 140 to 150 lbs./cu. ft. Such concrete is suitable for use in connection with many applications, and such concretes are particularly suitable for use in connection with load-bearing structural applications.

The prior art has recognized that in many applications "lightweight" concretes are desirable. "Lightweight" concrete, or low-density concrete, may be defined generally as a concrete with a density of less than the 140–150 lb./cu. ft. of conventional concretes. Such lightweight concretes often have a density of less than about 120 lbs./cu. ft. Lightweight concrete may be used in many applications including, for example, concrete construction blocks; insulating materials; decorative applications such as yard ornaments, patio or walkway blocks, and the like; upper-floor construction in multi-storied buildings; maritime applications, such as docks, floating bridges, boats, aircraft carrier decks, off-shore oil platforms, and the like; floors in steel frame buildings; roof structures or in roofing tiles; wallboard; spray-on applications; insulating and fire-proofing liners; backfill; and in numerous other applications.

The prior art has taught to prepare lightweight concrete using lightweight aggregates, including such materials such as perlite, vermiculite, polystyrene beads, polyethylene beads, pumice, scoria, tuff, or expanded materials such as shale, clay, slate, diatomite, fly ash, dross, or blast furnish slag. Many such aggregates are expensive and of limited availability. For example, polystyrene beads are petroleum-based and are in limited supply. Cinders generated in coal-fired boilers have been employed as aggregate materials, but increasing environmental awareness of the adverse impact of coal-fired boilers suggests a long-term supply problem. Similarly, materials such as pumice or scoria may require substantial labor or fuel costs or expensive and cumbersome processing equipment. Dross, a by-product of the iron and steel industries, can be expanded to form a lightweight aggregate by placing it into contact with water. However, dross is not uniform in its properties and thus may be difficult to process under exacting quality control conditions.

The prior art has further taught to prepare lightweight concretes by employing air voids in the concrete to reduce the overall concrete density. Generally, the prior art teaches to provide such air voids by entraining air in the concrete mix to form "cells" in the concrete matrix. While such methods generally will result in an overall decrease in cured concrete density, entraining air to form such cells often is less than a satisfactory solution. Air bubbles can compress at the bottom of deep concrete pours resulting in smaller cells than desired, thus resulting in a concrete of variable internal density and higher weight than desired. Air bubbles can also coalesce to form larger bubbles, thus resulting in a concrete of variable internal density and relatively reduced strength in the region of the air bubble.

More recently, U.S. Pat. No. 5,595,595 purports to teach the use of "aquagels," or starch pastes, as an aggregate material in a concrete composition. According to the teachings of this patent, aggregate material is prepared by cooking starch until it gelatinizes, spraying this gelatinized starch into a water-immiscible liquid, washing the aquagel thus formed to remove the water-immiscible liquid, and storing the starch until it is ready to be incorporated into a concrete composition. Alternatively, the gelatinized starch may be retrograded, dried, and ground into appropriately sized particles. When preparing a concrete composition, the dried particles are hydrated to thereby swell the particles to cause an increase in the volume. Upon curing of the concrete composition, water is said to be liberated from the swollen particles, thus causing them to shrink to their unhydrated size thereby providing a plurality of voids, or "cells," in the concrete.

The concrete compositions and aggregate materials postulated by the aforementioned U.S. Pat. No. 5,595,595 are unsatisfactory in a number of respects. For one thing, the preparation of the aquagel material in the manner taught is time-consuming, cumbersome, and expensive. In addition, the patent teaches that the aquagels preferably are chilled after washing to prevent bacterial growth and degradation, thus potentially entailing additional processing costs. Moreover, the dried and ground particles must be pre-hydrated in situ prior to adding to the other components of the concrete composition. The need for such in situ hydration is inconvenient and unwieldy, and potentially limits the applicability of the concrete composition.

THE INVENTION

The present invention is based upon the discovery that a concrete composition and, particularly, if desired, a lightweight concrete composition, can be prepared using water, a cementitious material, and an aggregate material that comprises granular starch, and more preferably, washed, pre-swollen crosslinked granular starch. Starch is an abundant and renewable natural resource, and is substantially inexpensive relative to other lightweight aggregate materials provided in the prior art. Moreover, especially when the starch is provided in the form of washed, pre-swollen crosslinked granules, there is no need to pre-hydrate the starch granules prior to mixing with the other components of the concrete composition. The invention thus can provide an inexpensive, lightweight composition that incorporates as an aggregate material an abundant, renewable resource.

In accordance with one embodiment of the invention, a curable composition comprising water, a cementitious material, and an aggregate material that includes a plurality of swollen starch granules is provided. It is believed that the starch granules will liberate water upon curing of the concrete composition, thus causing the volume of the granules to decrease. This deswelling provides a cured concrete composition that includes a plurality of cells similar to those formed by entraining air in the concrete, but of uniform size and dispersion in the concrete matrix. Thus, the invention also provides a cured concrete composition that comprises water, a cementitious material, and an aggregate that comprises a plurality of water-liberated swollen starch granules. The cured concrete composition preferably is a lightweight concrete composition, i.e., it has a cured bulk density of less than 120 lbs./cu. ft., more preferably, less than about 115 lb./cu. ft. The invention further encompasses a method for preparing a concrete composition, as well as a concrete composition prepared in accordance with this method.

Preferred features and other embodiments of the invention are set forth hereinbelow and in the appended claims.

DESCRIPTION OF THE PREFERRED EMBODIMENTS

The concrete composition of the invention generally comprises water, a cementitious material, and an aggregate material that, generally speaking, comprises granular starch. The water provided in the composition may be fresh water, tap water, sea water, natural or artificial brine, or, in general, any water source as may be determined suitable for use in a given application. The water is present in the uncured concrete composition in an amount effective to provide a curable concrete composition. Other additives as are known or as may be discussed to be useful in connection with concrete may be employed, and it is presently contemplated that set retarders or accelerators, water reducers, superplasticizers, air entraining chemicals, damp-proofers, colorants, corrosion inhibitors, and other additives may be used to impart desirable characteristics or working properties.

The cementitious material may be any suitable cementitious material known in the art or otherwise found to be suitable. While the preferred cementitious materials are selected from the Portland cements, other cementitious materials may be used, and among those known in the art, it is contemplated that rapid-setting cements, alumina cement, alumina/calcium oxide and/or calcium hydroxide cement, JET cement (consisting of a mixture of calcium homo-aluminate and calcium sulfate), Portland white cement, high-alumina cement, natural cements, gypsum cements and plasters, calcium aluminate cement, magnesia cements, common lime, hydraulic lime, puzzolan, and in general any other cementitious material that is suitable for fabrication into a concrete composition may be useful in conjunction with the invention.

The concrete composition further includes an aggregate material. In accordance with the invention, the aggregate material comprises plural starch granules. The granular starch used in conjunction with the invention may be any suitable granular starch, such as corn starch, high-amylose starches, wheat starch, potato starch, rice starch, tapioca starch and, in general, any starch that is compatible with the cementitious material. The starch preferably is present in a ratio of about 1% to about 20%, more preferably, from about 3% to about 10% dry basis weight by dry basis weight of the cementitious material, i.e., the total dry formula weight (the starch weight being calculated on an unhydrated basis), but more generally can be present in any other amount relative to cementitious material that is suitable to provide aggregation in the cured concrete. The starch should not be used in an amount that would prevent the concrete from setting (curing). Generally, concrete is considered to have set when a compression strength of 4000 psi is achieved, as measured, for example, by ASTM C403, although it is contemplated that in some applications a lower cured compression strength may be acceptable.

The starch is present in the uncured concrete composition in the form of a plurality of swollen starch granules. By "swollen" is contemplated granules that are hydrated with an amount of water effective to increase the granule size relative to the dry granule size. It is believed that in most or all embodiments of the concrete composition of the invention the starch granules will liberate water upon curing of the concrete composition and the volume of the starch granules will therefore decrease, thus creating cells in the cured concrete. While it is not intended to limit the invention to a particular theory of operation, the step of curing the concrete generally contemplates hydration of the cementitious material possibly accompanied by loss of water due to evaporation and/or bulk liquid drainage. These phenomena are believed to cause the liberation of water from the starch granules to form water-liberated starch granules that are believed to be of a relatively smaller size than the swollen starch granules. The starch granules generally have a granular size ranging from about 5 microns to about 30 microns nominal diameter when unswollen, and up to about 150% this diameter when swollen. It is believed that the starch granules may liberate water such that the granules may have a final moisture content greater than 0%, but less than the moisture content of the swollen starch granules in the uncured concrete composition.

In preferred embodiments of the invention, the starch granules comprise crosslinked starch granules. Numerous methods for crosslinking starch granules are known in the art, and in conjunction with the invention, any one of numerous crosslinking agents, such as sodium trimetaphosphate, epichlorohydrin, phosphorous oxichloride, dimethyl urea, or other chemicals known to crosslink starch or otherwise may be found in crosslinked starch may be used. The amount of crosslinker used likely will vary between different starches but, in general, should be used in an amount such as to allow the starch granules to swell when heated in water, but to maintain their swollen state without dissolving or pasting out. It is believed that extensive gelatinization or pasting of the starch will retard the curing of the concrete. For example, when epichlorohydrin is used as a crosslinking agent, it can be used in an amount ranging from about 0.01% to 1% by dry basis weight of the starch being crosslinked, more preferably, about 0.1% to about 0.5%. When sodium trimetaphosphate is used, it preferably is used from an amount ranging from about 0.5 to 2.5% by dry basis weight of starch. One suitable commercially available crosslinked starch is sold by Grain Processing Corporation of Muscatine, Iowa under the trademark PURE-DENT® B850, which is a crosslinked dent corn starch. Other suitable starches include PURE-GEL® B990, B992, B994, B996, and B980 also sold by Grain Processing Corporation of Muscatine, Iowa.

The extent of cross-linking of the starch granules will determine the level of swellability and of soluble organic content. Low levels of cross-linking will allow great swelling, which will result in a lower density cured concrete. However, the low levels of cross-linking will result in more soluble organic material, limiting the amount of starch which can be added and still allow the composition to set. Higher levels of cross-linking may limit or eliminate the ability of the starch granule to swell. The extent of cross-linking of the starch generally should not be such as to cause the concrete to fail to set while allowing the starch granules to be swellable.

Crosslinked starch granules when swollen in hot water include up to about 1% water-soluble organic material. As little as 0.005% of such organic material per dry basis weight of cementitious material in the dry concrete formula may undesirably or unacceptably retard the curing of the concrete. Thus, in accordance with the preferred embodiments of the invention, the starch granules are washed to substantially remove the soluble organic materials. In a highly preferred embodiment of the invention, the starch granules are washed and pre-swollen with water to reduce the amount of soluble organic materials to less than about 0.05% soluble organic material by dry basis weight of the entire starch granule. This washed starch then is dried.to reduce the moisture content of the starch below about 12%, and preferably in the range of about 9% to about 12% moisture. Starch granules that have been pre-swollen, washed and dried in such manner are approximately the same size as original starch granules; such starch granules may be referred to as RS (or rapid-swelling) starch granules. Such RS starch granules will quickly imbibe water and swell to their original swollen size upon being placed in contact with water. It is contemplated that by washing the starch granules, more starch may be incorporated into a concrete composition than by using unwashed starch granules, thereby allowing for preparation of a relatively lighter weight concrete at comparable aggregate loading levels.

Upon adding the starch granules to the water and cementitious material, the concrete is molded or formed into the desired shape or configuration and is allowed to cure. The curing of the uncured concrete composition may be performed via any suitable method, such as by heating, but, in general, the curing may be accomplished simply by allowing the concrete to set under ambient conditions. For example, the concrete composition can be poured into a substantially void mold or form and allowed to harden.

Once cured, the concrete composition can be made to have a density of less than about 130 lbs./cu. ft., more preferably, a density of less than about 120 lbs./cu. ft., more preferably, a density of less than about 115 lbs./cu ft., and even more preferably, a density ranging from about 90 to about 100 lbs./cu. ft. However, while the starch-based concrete compositions of the invention are suitable for use in connection with the preparation of such lightweight concretes, the invention is not limited thereto, and indeed starch may be used in connection with other aggregate materials in a concrete composition other than a lightweight concrete composition. If a lightweight concrete is desired, the starch may be used in connection with other lightweight concrete aggregates or entrained air in a lightweight concrete composition. Thus, the starch may be used, for example, in connection with a conventional aggregate material such as gravel or a conventional lightweight aggregate material such as pumice or others as previously mentioned. In addition, the starch may be used in relatively small amounts to provide a concrete composition having a density comparable to regular concrete composition, for example, a density of about 140 lbs./cu. ft. or greater.

The invention also encompasses a method for preparing a concrete composition. In accordance with this embodiment of the invention, the method comprises the steps of mixing a water, a cementitious material, and an aggregate to form an uncured composition, the aggregate comprising a plurality of starch granules as set forth above, and curing the uncured concrete composition. The starch granules may be added to the other components of the uncured concrete composition in swollen form or in dry form. When added in dry form, the amount of water used in the composition should generally be adjusted to account for the amount of water needed to swell the starch granules, generally increased by about one to five times the weight of the starch added. The invention further encompasses a concrete composition prepared in accordance with the method of the invention.

In carrying out the method or composition of the invention, various conditions of temperature, pH, and the like may be employed. The temperature and pH of the composition generally will be at ambient conditions, but both will rise during the curing process as the water reacts with the cement portion of the composition. No special condition of temperature or pH are contemplated. Other conditions as may conventional or otherwise found to be suitable may be employed.

The following Examples are provided to illustrate the present invention, but should not be construed as limiting in scope.

Preparation of RS Starch

The Example illustrates the preparation of washed, pre-swollen starch granules.

A slurry of PURE-DENT® B850, a crosslinked starch available from Grain Processing Corporation of Muscatine, Iowa, was prepared in water in a ratio of approximately 20% starch to 80% water. The temperature of the slurry was raised to about 200° F. by injecting steam, and the slurry was held at this temperature for 20 minutes. At this temperature, the crosslinked starch granules swelled and began to imbibe water.

These swollen crosslinked granules were then washed on a MERCO C-9 centrifugal washer, thereby reducing the soluble organic content of the swollen starch slurry to less than 0.05% by weight soluble organic material as determined by oven solids of the wash water. The washed starch was then dried on a Proctor and Schwartz belt dryer at a temperature of about 220° F. to 230° F. to a moisture content of 9–12% water. During this drying process, the swollen crosslinked starch granules liberated most of their imbibed water, and shrank to approximately their original granular size, thus providing RS starch.

When this RS starch thus prepared was mixed with tap water, the granules quickly reimbibed water and swelled to their original swollen size.

Preparation of Concrete

General Procedure and Conditions

In each of the following Examples, three inch diameter by six inch high test cylinders of concrete were prepared with the various concrete compositions set forth hereinbelow. The concrete compositions were prepared using Type I Portland cement from LaFarge, sand, starch, and water. The mixes were blended in a 10-quart Hobart mixer, Model C-100, at low speed, except as noted. Water was added as needed to achieve the desired mixture consistency, and the mixture blended from 3 to 5 minutes.

The test cylinders were poured into molds to within one-quarter inch at the top, rodded 20 times to minimize air bubbles and vibrated 30 seconds with an FMC Syntrom Jogger, Model J-1 at 100% dial setting to further minimize air bubbles. The cylinder molds were then topped off, leveled, and capped for curing.

The net weight of these test cylinders was determined (total weight less the mold and lid weight) and the uncured density was calculated. When the concrete test cylinders had sufficiently hardened, they were removed from the molds and allowed to continue to cure for a total of 28 days following the pour.

EXAMPLE 1

Crosslinked dent corn starch, PURE DENT® B850, was jet cooked at 296° F. with 60 pounds of back pressure. The cooking process caused the starch granules to swell but, because of the crosslinking, the starch granules did not solubilize or disperse. The swollen starch granules were allowed to settle in the solution until a slurry of approximately 15% solids was obtained.

Various concrete compositions were prepared using a 50/50 blend of dry cement and sand with a 15% starch granule slurry added to achieve a dry starch level of 2, 5, and 10% based on total dry material. In addition, a test cylinder was prepared without starch. Water was added as needed to achieve a workable mix.

The concrete compositions were evaluated for their uncured density and their cured density after 28 days. Some of the test cylinders were subjected to compression testing. The test cylinders were conditioned in accordance with standard practice, and were tested for compression strength at 7, 14, and 28 days with an Instron compression tester in accordance with ASTM C-39-86 to determine the amount of pressure applied to the test cylinders required to crush or fracture them. Tests were generally run in duplicate, with the average of the two results reported below.

The following results were obtained.

| Example | % Starch Content | Uncured Density (lbs./ft.$^2$) | 28-Day Cured Density (lbs./ft.$^2$) | 28-Day Compression Test |
|---|---|---|---|---|
| — | 0 | 2.19 g/cc (137 lbs./ft.$^3$) | 2.18 (136 lbs./ft.$^3$) | 7,500+ psi |
| 1A | 2 | 2.07 g/cc (129 lbs./ft.$^3$) | 2.02 (126 lbs./ft.$^3$) | 4,740 |
| 1B | 5 | 1.84 g/cc (115 lbs./ft.$^3$) | 1.68 (105 lbs./ft.$^3$) | 2,090 |
| — | 10 | 1.65 g/cc (103 lbs./ft.$^3$) | THIS SAMPLE DID NOT SET | |

This Example demonstrates that swollen starch granules may be used to prepare a lightweight concrete. It was believed that dissolved organic material in the starch portion of the mix may have retarded the concrete curing process in the concrete prepared using 10% starch.

Comparative Example

This Comparative Example illustrates the use of starch in a concrete composition.

Uncooked, unswollen starch granules were added in dry form to a blend of cement, sand and water (50/50 cement/sand ratio), to yield an uncured concrete composition that included 10% dry basis starch. Test cylinders were poured, the cylinder molds were capped, and the concrete compositions were allowed to cure. A minimum of eight cylinders were poured for each set of conditions. Two cylinders were retained to determine density and the remaining were submitted for compression testing.

The samples submitted for compressing testing did not sufficiently set to be tested at 7 and 14 days, and were discarded. The two retained samples had set sufficient at 14 days that they could be removed from the molds and tested for density at 28 days. The following densities were determined:

| Plastic Density | 28-Day Density |
|---|---|
| 1.96 g/cc (122 lb./ft.) | 1.84 g/cc (115 lb./ft.) |

Comparing these results with the results of Example 1, it is seen that the 28-day density is higher than the 28-day density of the concrete prepared with 5% of the swollen starch. From this, it was theorized that the uncooked starch granules did not swell satisfactorily in the uncured concrete, i.e., the void volume, if any, in the cured concrete was low relative to Example 1. It is believed that the failure to swell may be due, in part, to the high starch concentration and to the presence of soluble organic compounds. Further washing may help to remove such organic compounds.

EXAMPLE 3

Crosslinked starch was jet cooked at 220° F. with no back pressure except as resulting from the piping and the jet cooker. The swollen starch was allowed to settle and the liquid clear top portion above the settled starch was decanted. Fresh water was added and the mixture stirred, and again the starch granules were allowed to settle and the clear top liquid decanted. This was repeated for a total of five decantations.

Concrete compositions were prepared in accordance with Example 1 and evaluated for density and compression strength. The following results were obtained:

| EXAMPLE | % Starch Content | Plastic Density | 28-Day Cured Density | 28-Day Compression Test |
|---|---|---|---|---|
| — | 0 | 2.17 g/cc (135 lbs./ft.$^3$) | 2.16 g/cc (135 lbs./ft.$^3$) | 9,720 |
| 3A | 1.0 | 2.18 g/cc (136 lbs./ft.$^3$) | 2.16 g/cc (135 lbs./ft.$^3$) | 9,965 |
| 3B | 2.5 | 2.08 g/cc (130 lbs./ft.$^3$) | 1.99 g/cc (124 lbs./ft.$^3$) | 7,285 |
| 3C | 4.7 | 1.96 g/cc (122 lbs./ft.$^3$) | 1.80 g/cc (112 lbs./ft.$^3$) | 4,860 |

Example 3C as a lightweight concrete composition.

EXAMPLE 4

Jet cooked starch was washed to a wash water oven solids of 0.06%. A 25%/75% cement/sand blend was prepared and blended with the starch and water. The amount of time determined for the concrete to cure to 5,000 psi was noted, as determined with a Morton penetration resistance apparatus H-4137, Humboldt Manufacturing Co., applied according to ASTM C403. The following results were obtained:

| EXAMPLE | % Starch Content | Uncured Density | 28-Day Cured Density | Approx. Time to 5,000 psi Set |
|---|---|---|---|---|
| — | 0 | 2.22 g/cc (138 lbs./ft.$^3$) | 2.18 g/cc (136 lbs./ft.$^3$) | <7 hr. |
| 4 | 5 | 1.98 g/cc (123 lbs./ft.$^3$) | 1.74 g/cc (108 lbs./ft.$^3$) | <20 hr. |

-continued

| EXAMPLE | % Starch Content | Uncured Density | 28-Day Cured Density | Approx. Time to 5,000 psi Set |
|---|---|---|---|---|
| — | 10 | 1.71 g/cc (107 lbs./ft.$^3$) | Never set | |
| — | 15 | 1.55 g/cc (96.7 lbs./ft.$^3$) | Never set | |

It is believed that the failure to set of the 10% starch composition was due to the presence of organic solubles in the starch.

EXAMPLE 5

A crosslinked starch, PURE-DENT® B850, was cooked at 200° F. for 20 minutes at atmospheric pressure and then was washed to a conductivity of 230 µs and subsequently belt dried. Wash water over solids were well below 0.06%. The dried starch was added in separate examples to a 25%/75% blend of cement and sand to yield starch content of 3, 6, 9, and 12% dry starch on total dry material. Water was added to produce a mix consistency that was workable, and test cylinders were then poured. The following results were obtained:

| EXAMPLE | % Starch Content | Plastic Density | 28-Day Cured Density | Set Time to 4,000 psi (hr.) |
|---|---|---|---|---|
| — | 0 | 2.24 (g/cc) (140 lbs./ft.$^3$) | 2.18 (g/cc) (136 lbs./ft.$^3$) | ~8 |
| 5A | 3 | 2.19 (g/cc) (137 lbs./ft.$^3$) | 2.12 (g/cc) (132 lbs./ft.$^3$) | ~8 |
| 5B | 6 | 1.97 (g/cc) (123 lbs./ft.$^3$) | 1.73 (g/cc) (108 lbs./ft.$^3$) | ~16 |
| 5C | 9 | 1.79 (g/cc) (112 lbs./ft.$^3$) | 1.48 (g/cc) (92 lbs./ft.$^3$) | ~30 |
| 5D | 12 | 1.69 (g/cc) (105 lbs./ft.$^3$) | 1.30 (g/cc) (81 lbs./ft.$^3$) | @116 hr. = 2,900 psi |

Examples 4 and 5 and the Comparative Example illustrate that the set time of the concrete and the density of the cured concrete can depend on the level of soluble organic material present in the granular starch. The concrete of Example 5D contains a very high starch content that approaches or is at the limit for this particular concrete blend.

EXAMPLE 6

Example 5 was repeated with various starch concentrations, and the 28-day compression strength was evaluated for each cylinder. The following results were obtained:

| EXAMPLE | % Starch Content | Plastic Density | 28-Day Cured Density | 28-Day Compression Test |
|---|---|---|---|---|
| — | 0 | 2.28 (g/cc) (142 lbs./ft.$^3$) | 2.24 (g/cc) (142 lbs./ft.$^3$) | 7,020 |
| 6A | 3 | 2.17 (g/cc) (135 lbs./ft.$^3$) | 2.07 (g/cc) (129 lbs./ft.$^3$) | 3,335 |
| 6B | 7 | 1.89 (g/cc) (118 lbs./ft.$^3$) | 1.62 (g/cc) (101 lbs./ft.$^3$) | 918 |
| 6C | 11 | 1.71 (g/cc) (107 lbs./ft.$^3$) | 1.31 (g/cc) (82 lbs./ft.$^3$) | 288 |

This example further illustrates that the density of the cured concrete composition depends on the starch concentration in the uncured concrete composition, and that the setting of the concrete can depend on the level of organic solubles present in the starch.

EXAMPLE 7

Potato starch (Superior Brand, Germany, 972 g, dry solids basis) was slurried in 1,294 g of tap water. A sodium chloride solution (5%, 49 g) was added followed by 311 g of caustic brine. The titratable alkalinity of the solution was 152 mL. Hydrochloric acid was added to the mixture to give a final titratable alkalinity of 131 mL. Sodium trimetaphosphate, 3.5%, 34 g, was then added to the mixture and allowed to stir for twenty hours at ambient temperature. The pH of the mixture was then adjusted to 6.0 with 40 mL of 6N hydrochloric acid. The resulting product was filtered, washed with 10 L of deionized water and dried.

The crosslinked potato starch thus prepared was cooked at 200° F. for 20 minutes in an excess of water to swell the starch granules. These swollen granules were then washed as described in Example 3 to a wash water oven solids of 0.027% to remove soluble organic materials. Concrete compositions were prepared at a 25% cement/75% sand blend and evaluated for density and compression strength.

The following results were obtained:

| EXAMPLE | % Starch Content | Plastic Density (g/cc) | 28-Day Cured Density (g/cc) | 28-Day Compression Test (psi) |
|---|---|---|---|---|
| — | 0 | 2.26 g/cc (141 lbs./ft.$^3$) | 2.21 g/cc (138 lbs./ft.$^3$) | ~7,020 |
| 7A | 4.6 | 2.06 (128 lbs./ft.$^3$) | 1.80 g/cc (112 lbs./ft.$^3$) | 1,770 |
| 7B | 9.4 | 1.81 g/cc (113 lbs./ft.$^3$) | 1.41 g/cc (88 lbs./ft.$^3$) | 405 |

This Example illustrates that potato starch is useful in connection with the preparation of lightweight concretes. While the concrete of Examples 7A and 7B did not set to 4000 psi, the concrete is useful in many applications, such as decorative applications.

Thus, it is seen that the invention provides concrete compositions prepared using granular starch as the aggregate material, and further provides a method for preparing such concrete compositions.

While particular embodiments of the invention have been shown, it will be understood that the invention is not limited thereto since modifications may be made by those skilled in the art, particularly in light of the foregoing teachings. It is, therefore, contemplated by the appended claims to cover any such modifications as incorporate those features that constitute the essential features of these improvements within the true spirit and scope of the invention.

What is claimed is:

1. A method for preparing a concrete composition, comprising the steps of;

providing a plurality of dry washed, pre-swollen starch granules;

mixing said starch granules with water and a cernentitious material to form a curable concrete composition, said granules being in dry form when mixing with water and said cementitious material; and curing said concrete composition.

2. A method according to claim 1, said starch comprising a crosslinked starch.

3. A method according to claim 1, said starch granules comprising RS starch granules.

4. A method according to claim 1, said starch being present in said composition in an amount ranging from about 1% to about 20% dry basis weight by dry basis cementitious material.

5. A method according to claim 1, wherein said cementitious material is selected from the group consisting of Portland cement, limes, and puzzolan.

6. A method according to claim 1, further including a second aggregate material.

7. A method according to claim 6, wherein said second aggregate material is selected from the group consisting of gravel and sand.

8. A method according to claim 6, wherein said second aggregate material is pumice.

9. A method according to claim 1, further including entrained air cells.

* * * * *

UNITED STATES PATENT AND TRADEMARK OFFICE
CERTIFICATE OF CORRECTION

PATENT NO.    : 6,387,171 B1
DATED         : May 14, 2002
INVENTOR(S)   : Taylor et al.

It is certified that error appears in the above-identified patent and that said Letters Patent is hereby corrected as shown below:

Column 5,
Line 8, "dried.to" should read -- dried to --

Signed and Sealed this

Thirtieth Day of July, 2002

Attest:

JAMES E. ROGAN
Attesting Officer     Director of the United States Patent and Trademark Office